US011096068B1

(12) United States Patent
Burt (10) Patent No.: US 11,096,068 B1
(45) Date of Patent: Aug. 17, 2021

(54) PANEL ANTENNA MONITORING

(71) Applicant: Atavious F. Burt, Greensboro, NC (US)

(72) Inventor: Atavious F. Burt, Greensboro, NC (US)

( * ) Notice: Subject to any disclaimer, the term of this patent is extended or adjusted under 35 U.S.C. 154(b) by 589 days.

(21) Appl. No.: 15/299,874

(22) Filed: Oct. 21, 2016

Related U.S. Application Data

(60) Provisional application No. 62/245,063, filed on Oct. 22, 2015.

(51) Int. Cl.
*H04W 24/00* (2009.01)
*G06K 7/10* (2006.01)
*H04W 88/08* (2009.01)

(52) U.S. Cl.
CPC ........ *H04W 24/00* (2013.01); *G06K 7/10366* (2013.01); *H04W 88/08* (2013.01)

(58) Field of Classification Search
CPC ... H04W 24/00; H04W 88/08; G06K 7/10366
USPC ........................................................ 455/424
See application file for complete search history.

(56) References Cited

U.S. PATENT DOCUMENTS

| | | | |
|---|---|---|---|
| 8,022,885 B2 | 9/2011 | Smoyer et al. | 343/761 |
| 8,085,211 B2 | 12/2011 | Yang et al. | 343/766 |
| 8,471,780 B2 | 6/2013 | Dalmazzo | 343/894 |
| 8,766,873 B2 | 7/2014 | Dalmazzo | 343/894 |
| 2005/0022403 A1* | 2/2005 | Moskowitz | A61M 27/006 33/355 R |
| 2006/0270421 A1* | 11/2006 | Phillips | H04W 4/021 455/457 |
| 2007/0174152 A1* | 7/2007 | Bjornberg | G01C 15/00 705/28 |
| 2009/0141623 A1 | 6/2009 | Jung et al. | 370/229 |
| 2009/0278949 A1* | 11/2009 | McMahan | G06F 17/30247 348/222.1 |
| 2010/0148963 A1* | 6/2010 | O'Hern | G06Q 10/087 340/572.1 |
| 2012/0098664 A1* | 4/2012 | Nordin | G06Q 10/087 340/572.1 |
| 2012/0313757 A1* | 12/2012 | Volpi | G06K 7/0008 340/10.1 |
| 2014/0218249 A1 | 8/2014 | Kolokotronis | 343/765 |
| 2015/0130593 A1* | 5/2015 | Mats | G06K 7/10366 340/10.1 |

* cited by examiner

*Primary Examiner* — Charles N Appiah
(74) *Attorney, Agent, or Firm* — MacCord Mason PLLC (57) ABSTRACT

An apparatus for monitoring equipment on a cellular telephone tower includes equipment on a cellular telephone tower, with RFID tags attached to the equipment. The tags are on different items of equipment and store data about the equipment. An RFID interrogator reads the RFID tags and transmits to a remote user. The equipment includes a panel antenna, an antenna attachment that includes a camera, an altimeter, a compass, an inclinometer, and data connections from them to a remote computer, providing information about a panel antenna's height, azimuth and inclination and a visual view of the proximity of the antenna. The camera, inclinometer and compass are located within an RF protective shield enclosure to avoid RF interference, and a computer has software to create a plumbing diagram from the gathered data to make a plumbing diagram showing the configuration of the equipment on the cellular telephone tower.

13 Claims, 10 Drawing Sheets

PANEL ANTENNA MONITORING

BACKGROUND OF THE INVENTION

The Federal Communications Commission (FCC) regulates spectrum for interstate and international communications in the United States of America, including the District of Columbia, and the Unites States territories. The communication avenues consist of radio, television, wire, satellite and cable. The evolution of GSM, TDMA, CDMA and now LTE has given wireless carriers such as Verizon, AT&T, T-Mobile and many more wireless companies the ability to provide voice and data service to their customers' current and future demands.

Today, Design and Optimization engineers depend on panel antennas mounted on transmission towers, monopoles, and buildings to provide voice and data to their customers. Panel antennas are the most important devices that propagates radio frequency signal to cover a desired area.

Panel antennas patterns are implemented into prediction tools such as Atoll, Asset, or Planet to build wireless networks for AT&T, Verizon, Sprint, and T-Mobile etc. Construction, design and optimization engineers spend countless hours gathering data from the networks in order to add new site builds and to optimize their on-air sites. There can be as many as twelve panel antennas per site. These panel antennas today provide coverage over a particular area such as a highway, street, business, and home.

Today RF design engineers utilize a vertical view to design cellular networks. The limitation of a vertical view via Google Earth is quickly becoming obsolete and antiquated.

Cellular providers all over the world are finding it difficult to manage their existing market data that consist of towers, small cells and DAS systems. Hiring Turf vendors, construction crews, and RF Engineers to execute the scope of work has made much of their network data inaccurate. With pressure in getting the site on air at its scheduled due date, data is mistakenly entered into the system. Therefore resulting in more money spent verifying what is exactly at the site before making additional modifications to it.

To deal with this lack of data integrity, on-site personnel have to spend time auditing the configuration of a site configuration. This may include steps such as:

1. Tape drops to confirm height of mounted devices (which could be TMA, RRU, Diplexers, Quadplexers, Cabinet type)
2. Confirm the technology of the mounted devices
3. Confirm the make/model of the mounted devices
4. Confirm serving technology of the mounted devices, i.e. what kind of cell service
5. Confirm the position of the mounted devices There is a need in the art to enhance the existing widely used panel antenna to minimize cost and time to design and optimize mobile networks.

SUMMARY OF THE INVENTION

The present invention fulfills one or more of these needs in the art by providing a system for monitoring equipment on a cellular telephone tower that includes RFID tags attached to the equipment to be monitored, each tag being on a different item of equipment and storing data about the equipment, and an RFID interrogator in close enough proximity to the RFID tags to interrogate the RFID tags, receive the data stored on the RFID tags about the equipment, and transmit the data to a remote user.

The system may include an apparatus for monitoring a panel antenna including an attachment to the panel antenna comprising a camera, an altimeter, a compass, an inclinometer, and data connections from the camera, altimeter, compass, and inclinometer to a remote computer, so that a user at a remote computer can have information about a panel antennas height, azimuth and inclination and a visual view of the proximity of the antenna.

Preferably the camera, inclinometer and compass are located within an RF protective shield enclosure. Typically, the altimeter mounts to the back of the panel antenna.

Also disclosed is a computer equipped with software to create a plumbing diagram from data gathered from the altimeter, compass, and inclinometer and RFID tags.

The system may read device data with sensors and combine it with identification data from RFID tags attached to the devices to verify how devices are plumbed from bottom to top of tower to the antenna. For example, the sensor may indicate the height of a device and the RFID tags may provide the make and model of the device. Using the system, these combinations of identification and useful data can be generated for the various items plumbed on the tower to the antenna.

The system may track each tower cabinet located at bottom of tower.

The system may eliminate drones use to verify what type of equipment that is plumbed on the tower.

The system may decrease time spent auditing towers every few years for decommissioning and adding equipment to tower.

The system may be used on various tower structures, such as monopoles, lattice, guide, water towers and utility poles.

The system may improve RF design and optimization activities for wireless providers.

The system may allow each device plumbed to tower to be tracked and accounted for with sensors and RFID tags.

The system may provide an accurate cell tower inventory improving carrier's assets management which results in speed to market of new technologies to be implemented.

In some embodiments, voice recognition or voice command software can be used to create or input data to the design file and/or plumbing diagram. Also disclosed is web based software to create a design file and plumbing diagram, or other storage or active use.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
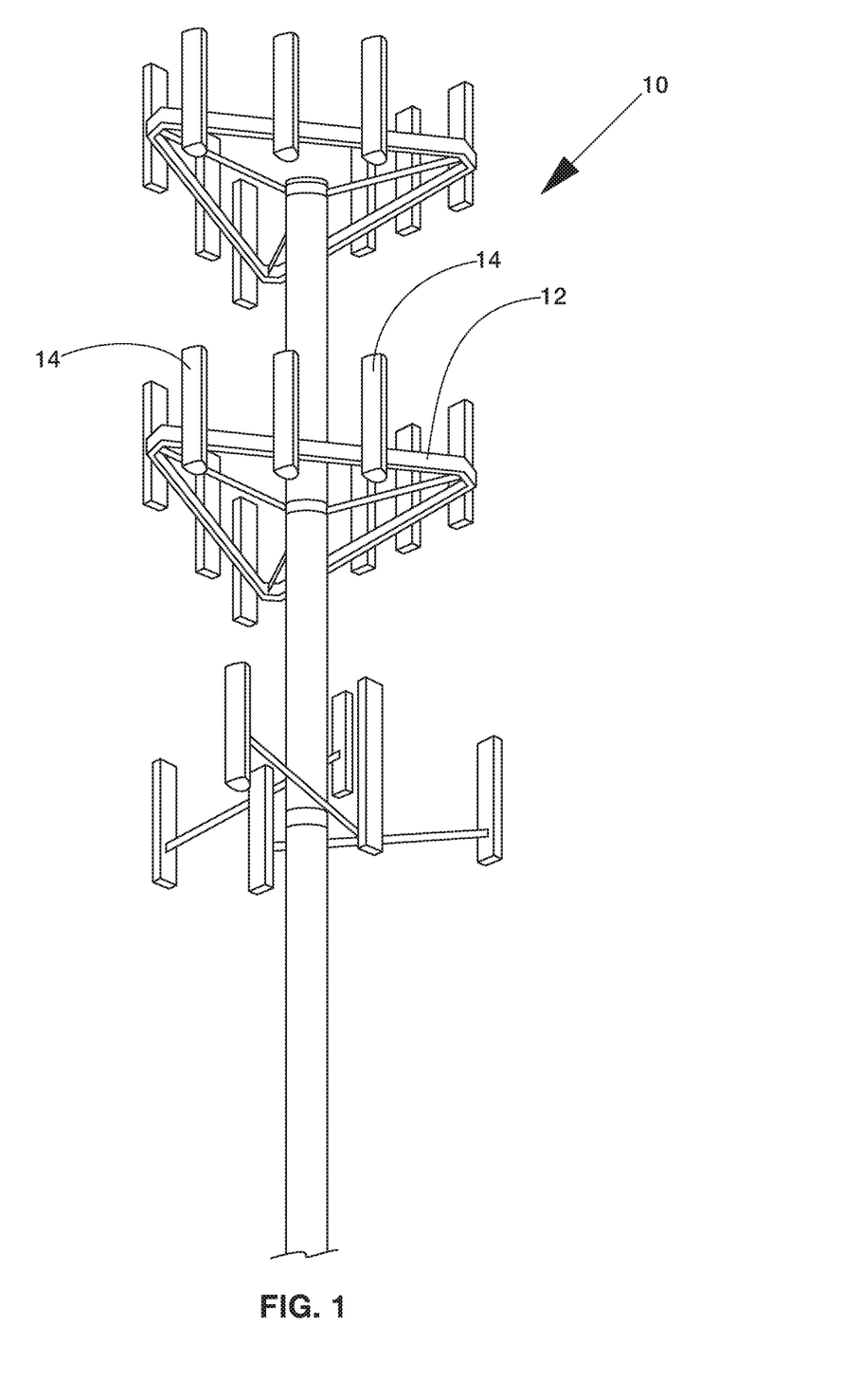
FIG. 1 is a view of a typical tower supporting numerous panel antennas for cellular telephony.

FIG. 1 shows a conventional tower 10 supporting numerous panel antennas 14 for cellular telephony. The antennae are affixed to brackets 14 to hold them in position, so that they radiate and receive transmissions. The area on the ground with which they make strong signal connections is highly dependent on their orientation on the bracket, including the height of the antenna off the ground, direction in which a primary radiating axis of the antenna is facing and up or down tilt. While this data is very important to assure reliable and thorough ground coverage, often engineers in charge of maintaining the towers do not have that data in a fashion which is reliable.

Preferred embodiment of the invention provide information about what devices are on a tower, and preferably monitors the devices on the tower. RFID tags on the devices send device data back to client's network. The information received from tag preferably includes the make and model of each device, for example serial number, make and model. Additional information about the device's height and position within the cabinet and on tower structure is collected with sensors and coupled to the RFID tag information. The information is captured and sends reports to transmission to a remote location.

Radio Frequency Identification (RFID) systems featuring so-called "smart tags" or "smart labels" and the associated electronic devices for remotely writing information to and reading information from these smart tags or labels are known. Similar electronic tags were developed by the United States National Laboratory at Los Alamos, N.M. for the Department of Agriculture to identify and track livestock animals. One supplier, Texas Instruments, Inc., has marketed such RFID products and systems under the trademark TAG-IT®. As this technology has developed, RFID systems have been used to address a number of needs. For example, U.S. Pat. No. 4,912,471 to Tyburski, et al. and U.S. Pat. No. 5,351,052 to D'Hont, et al. disclose the use of RFID systems for the identification of and communication between moving vehicles such as automobiles or railroad cars. Also, U.S. Pat. No. 5,030,807 issued to Landt, et al., U.S. Pat. No. 5,971,437, issued to Sakashita, and U.S. Pat. No. 6,019,394, issued to Chenoweth disclose the use of RFID systems for identification and control of various moveable objects.

Figure 8:
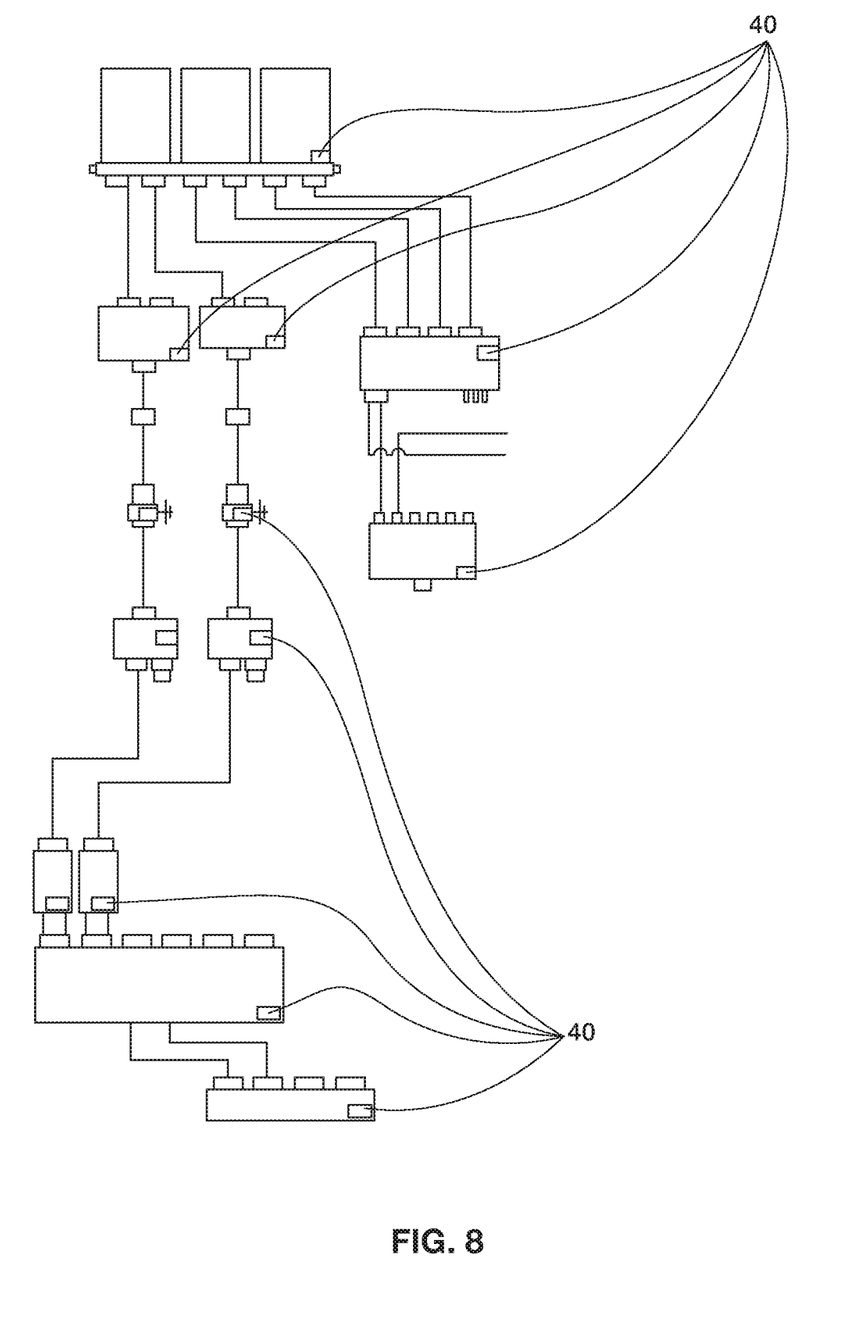
FIG. 8 is a schematic "plumbing diagram" showing the various connections of panel antennae and other circuit components of a typical tower installation and their associated RFID tags.
Figure 9:
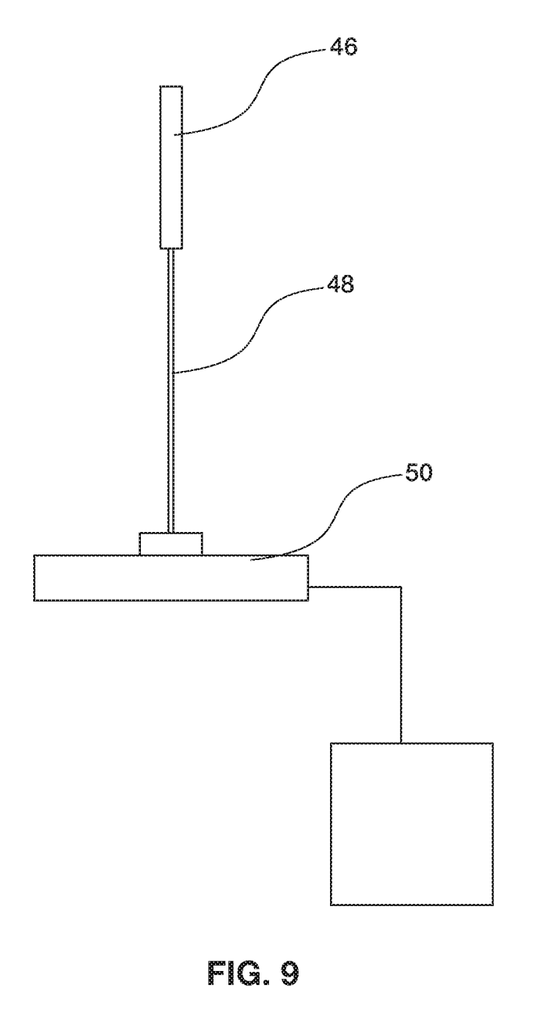
FIG. 9 show a schematic diagram of the RFID antenna and its Data Console.
Figure 10:
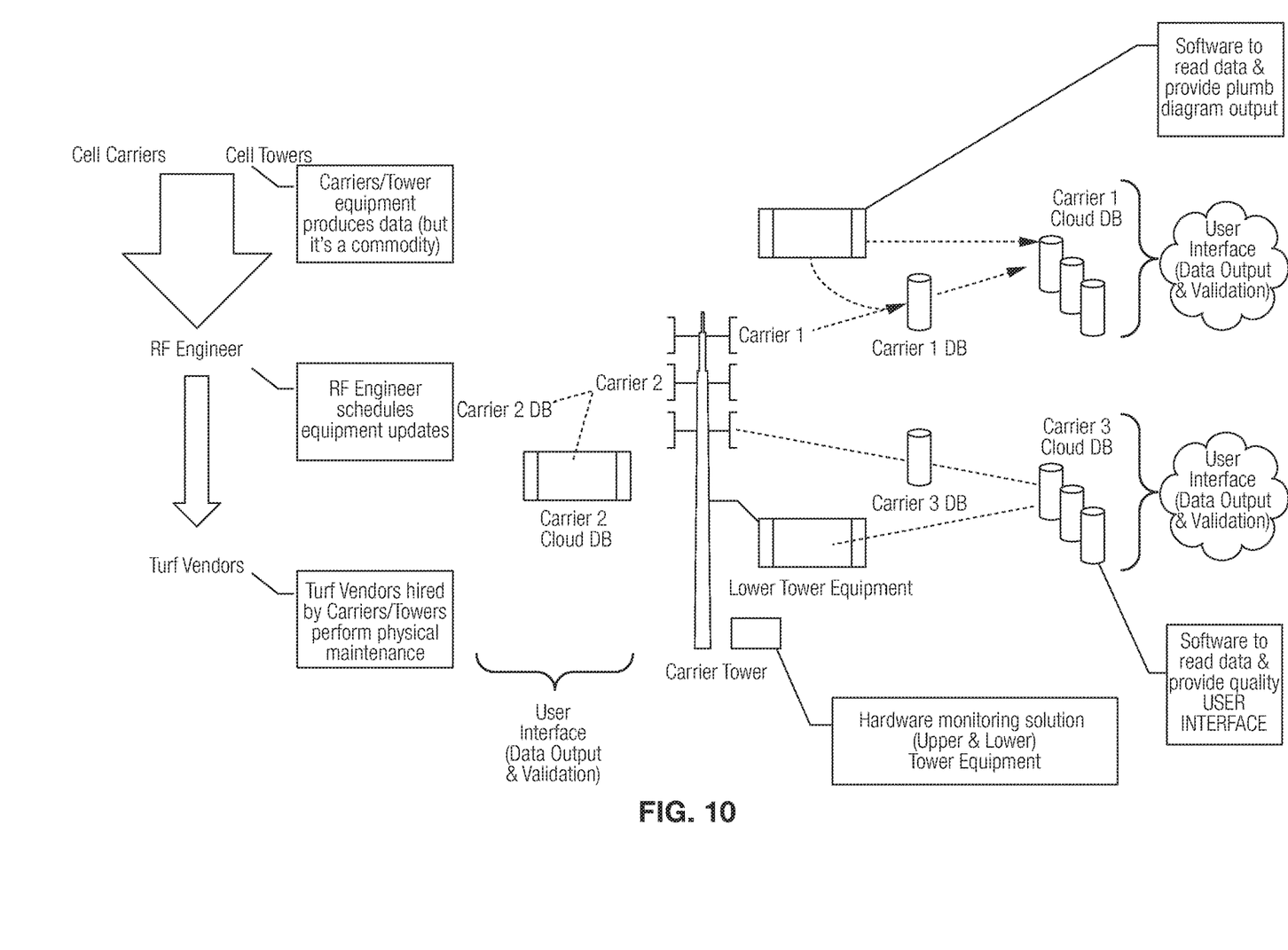
FIG. 10 shows an overall schematic of the roles of the Cell phone carriers, RF Engineers, turf vendors with respect to a cell phone tower having three levels (and three carriers), in coordination with a system in accordance with the invention.

As seen in FIG. 8, RFID tags 40 are attached to each item to be monitored and store information about the item. Alternatively, the tags can simply have unique identifiers that correlate with item identifiers stored elsewhere, such as in the client's network 56 (see FIG. 9). FIG. 9 shows the RFID system's antenna 46, connector 48 and Data Console 50 in operative relationship within a distance from the RFID tags 40. The tags 40 and antenna 46 are close enough to one another for RFID operation, so the antenna is likely to be mounted on the tower in proximity to the devices having the tags. When the Data Console 50 or other control sends a signal to the Antenna 46, it interrogates the RFID tags 40, which return their stored information, which is in turn sent to the Data Console 50, which relays it to the client's network 56. That data can be used by devices in the network 56 to populate a database, spreadsheet or other storage mode, or be compared to a previously-stored data to verify that the data remains current.

The system may combine the data from the RFID tag with data received from sensors associated with the items to be monitored, to make a composite data that identifies the item and gives data sensed about the item. Further discussion of the sensing capabilities that may be possible follows.

Figure 2:
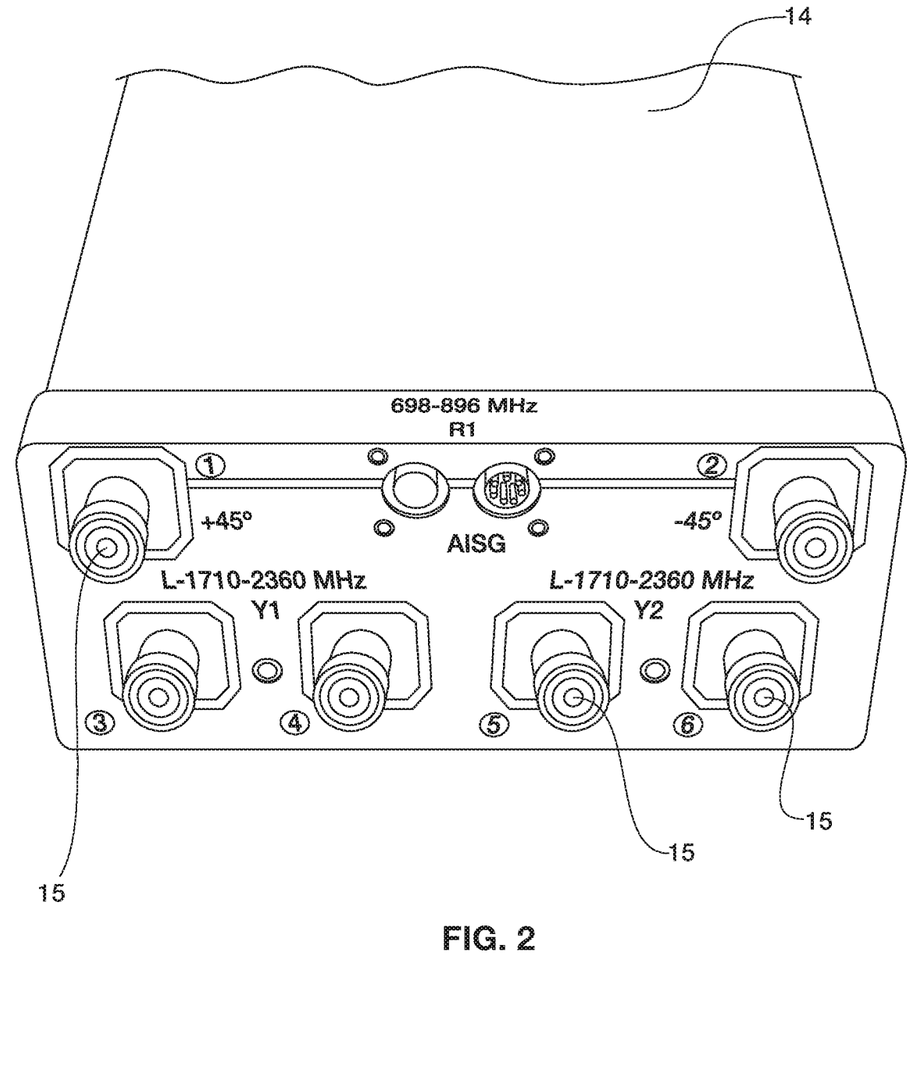
FIG. 2 is a bottom perspective view of a typical panel antenna.
Figure 5:
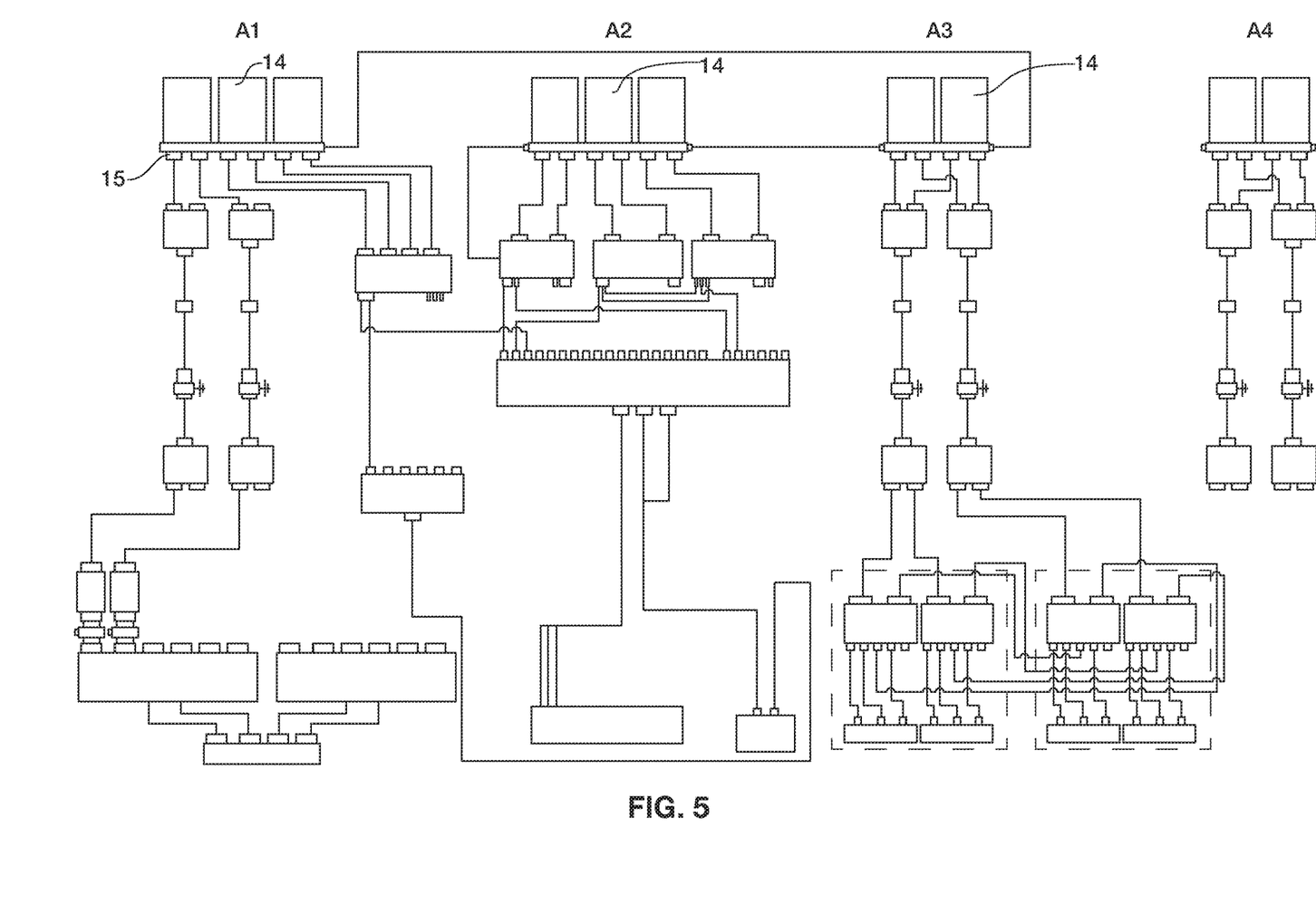
FIG. 5 is a schematic "plumbing diagram" showing the various connections of panel antennae and other circuit components of a typical tower installation.
Figure 6:
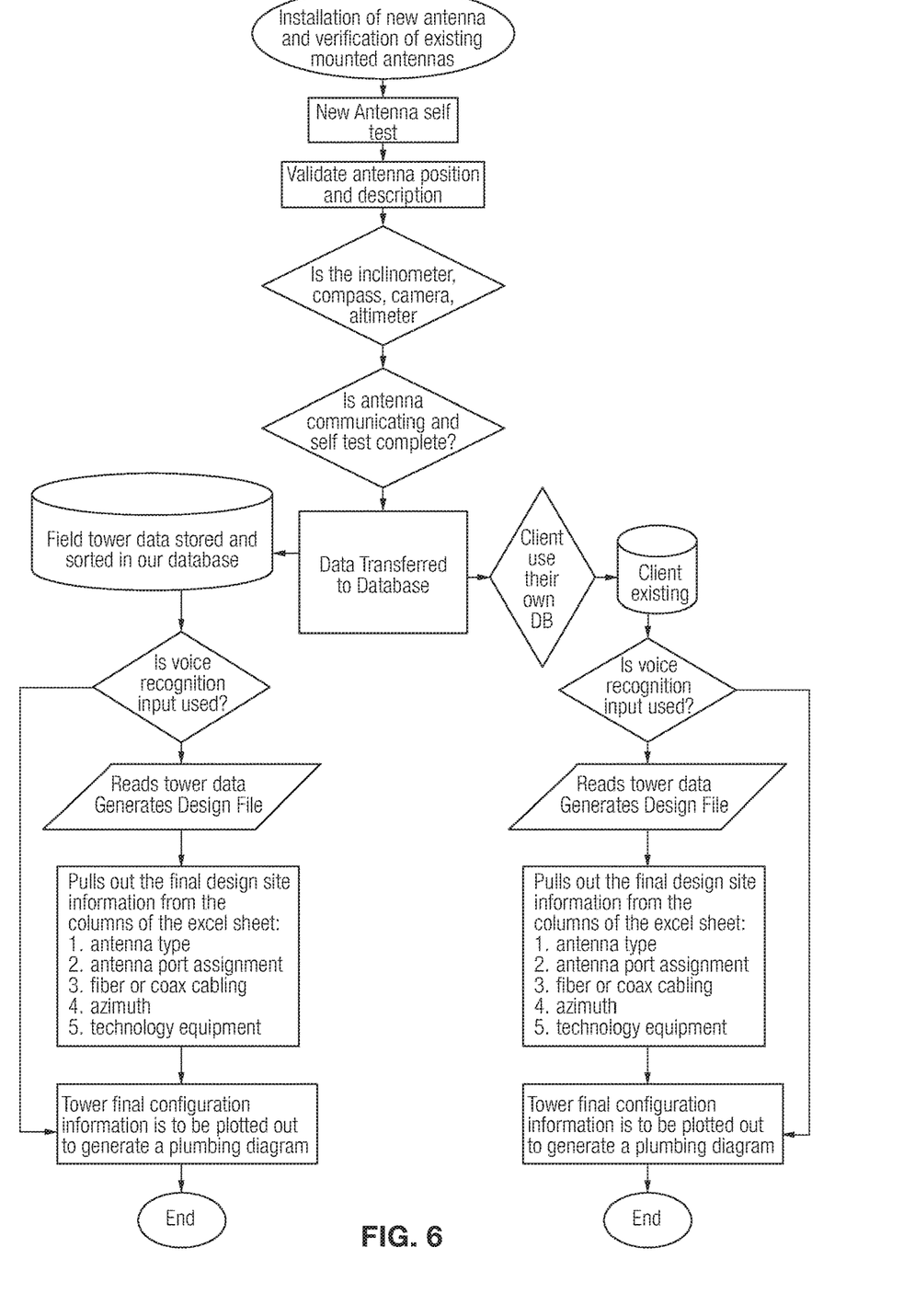
FIG. 6 is a flow chart showing software processing of data gathering to generate a design file and plumbing diagram.
Figure 7:
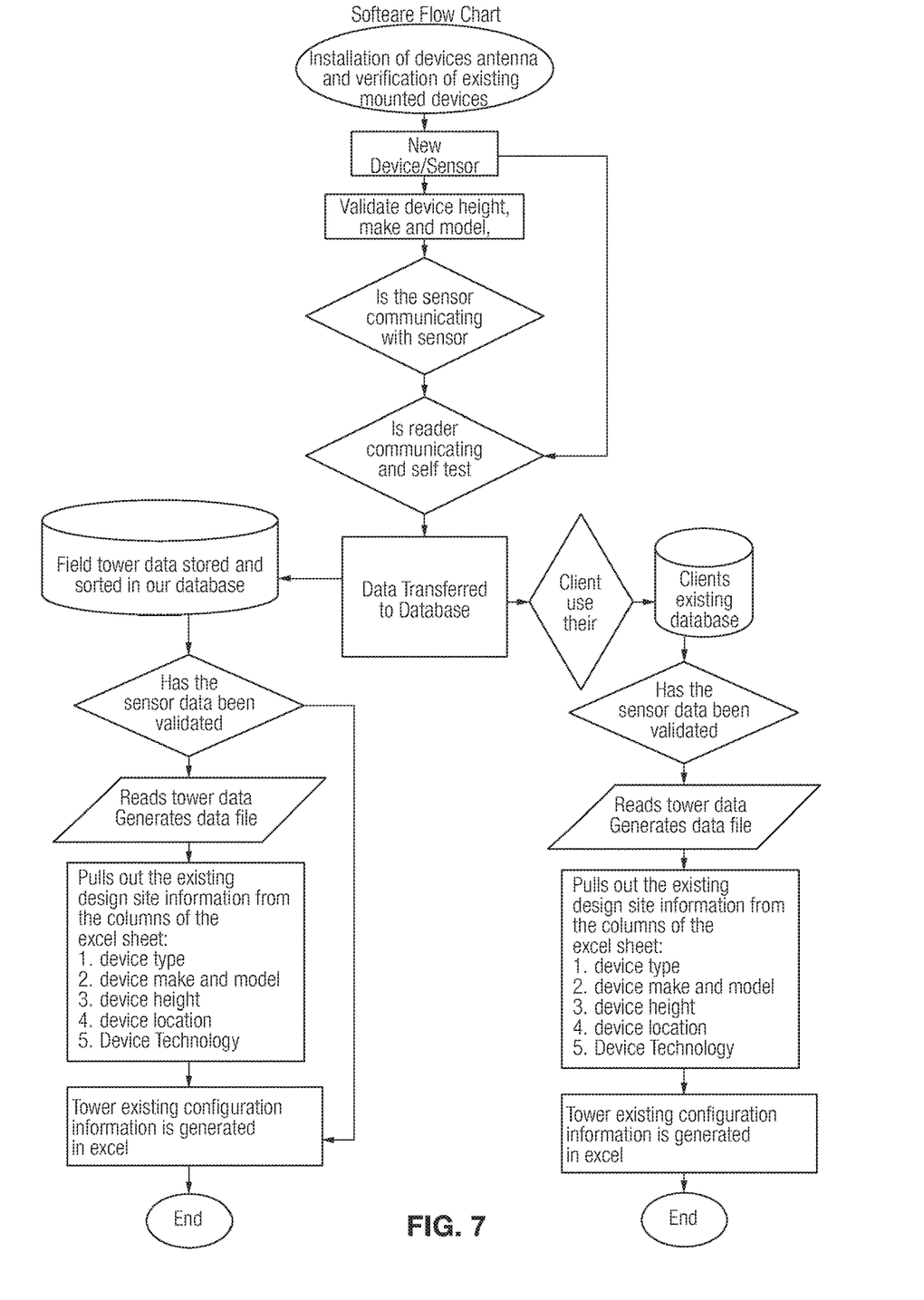
FIG. 7 is a flow chart showing software processing of data gathering to identify the devices (items) on a tower.

FIG. 2 shows a bottom of a conventional panel antenna 14, showing several connections 15 on the antenna. In practice, selected ones or all of the connections have RF coaxial connectors that extend to other components of the tower, as seen generally in FIG. 5. The various connections may join appropriate parts of the antenna 14 with selected data transfer modules operating in modes such as 2G, 3G, GSM, etc. Correct connection of the appropriate connection 15 to the correct module is essential for correct functioning. Thus, plumbing diagrams like the diagram of FIG. 5 are often constructed to plan for new installations or for modification of existing installations. Conventionally, plumbing diagrams are constructed by engineers to map out connections from a Design File. The design file is usually in the form of a spreadsheet, with the plumbing diagram manually created from the data in the design file. The data in the design file includes much that overlaps the data discussed above to assure reliable and thorough ground coverage (i.e. orientation of the antenna on the bracket, the height of the antenna off the ground, direction in which a primary radiating axis of the antenna is facing and up or down tilt). Thus obtaining that data reliably not only allows an engineer to ascertain if an installation meets its specified mounting parameters, it also can facilitate the design of new or revised plumbing diagrams for modifications of installations. The data for the plumbing diagram preferably includes data read from one or more of the RFID tags. That is, the data read from the RFID tags is coupled to the other collected data to assist in preparing the plumbing diagrams. The plumbing diagram is preferably created automatically by software. The software creates a virtual inventory management database of their towers, giving engineers the ability to track and monitor their devices and make better asset decisions. The software may have one or two or both of two outputs that show the configuration of tower. These outputs could be in a spreadsheet such as Excel or a visual layout of the configuration using software such as Visio or the like.

Figure 3A:
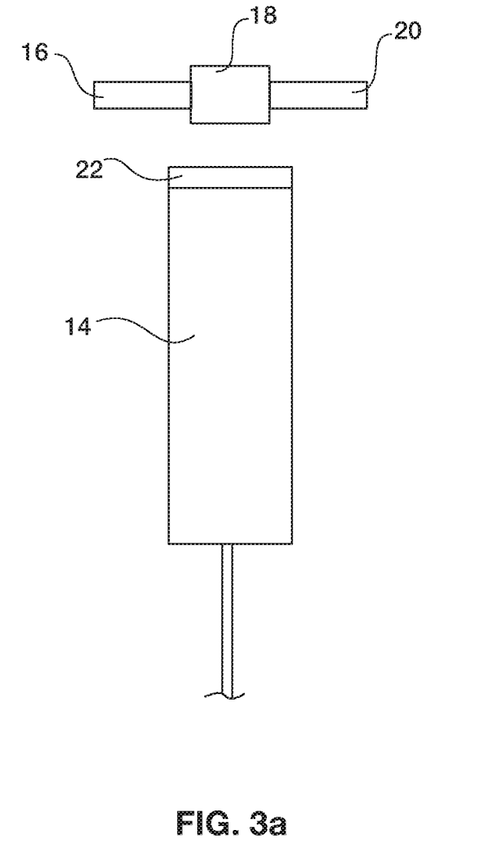
FIG. 3(a) is a schematic view of a front of a panel antenna outfitted with components for an embodiment of the invention.
Figure 3B:
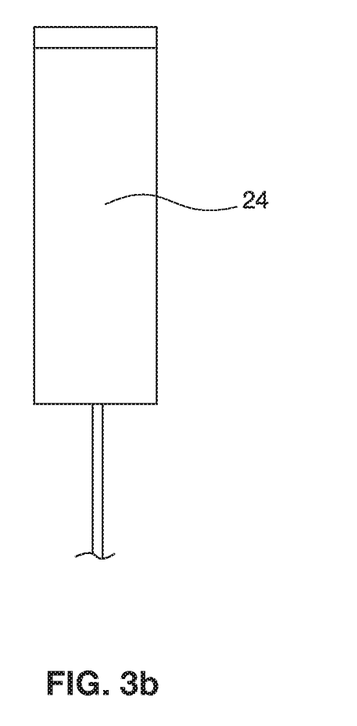
FIG. 3(b) is a schematic view of a back of a panel antenna outfitted with components for an embodiment of the invention.
Figure 4:
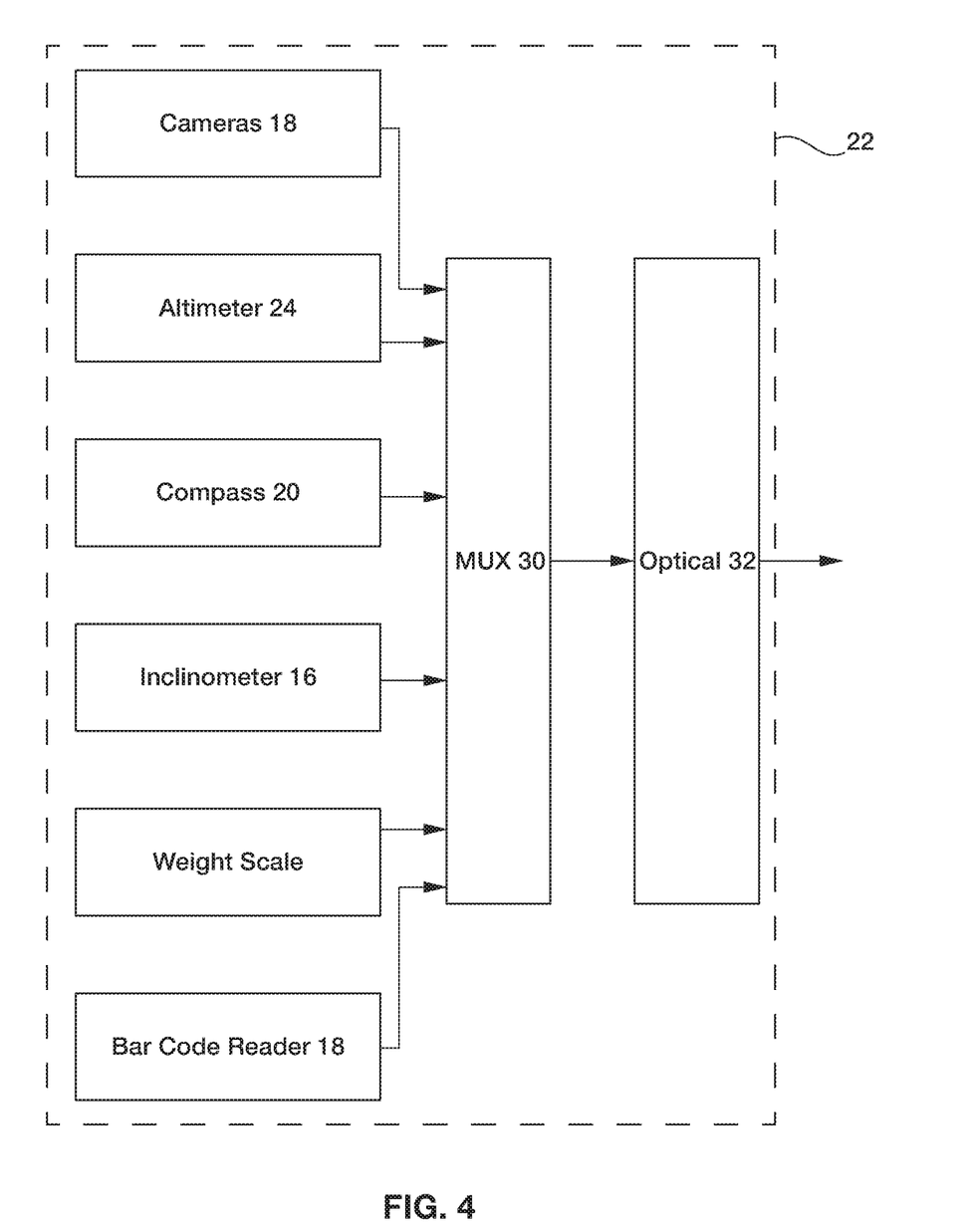
FIG. 4 is a block diagram of the various sensors in a suitable circuit for an embodiment of the invention.

FIGS. 3a and 3b show in schematic form, the addition of sensors to the panel antenna 14. The sensors can be attached externally, as shown, or attached within the antenna housing. FIG. 4 shows one way to connect those sensors to databases available to Design and Optimization engineers in their offices. In accordance with the invention the antennae are equipped with one or more of an inclinometer (such as a dual axis inclinometer) 16, two or more mini video cameras 18, an azimuth reader (such as a compass), and a device for determining the height of the antenna above ground 24 (such as an altimeter or laser distance reader). These data gathering sensors are mounted to the antenna in a known fashion, so that variations in location, orientation, etc. of the sensor accurately signify variations in the antenna. The sensors can be added to an existing antenna or made as original equipment components of the antenna.

Each of these data gathering instruments is of the type that outputs an electrical signal. As seen in FIG. 4, their electrical outputs can be connected as inputs to a device such as a multiplexer 30, to create a formatted data stream that is then applied to an electrical-to-optical converter 32. Converter 32 outputs the data stream over fiber optics to travel back to computers available to the Design and Optimization engineers, where the optical signal is converted back to electrical and the data signals demultiplexed and the data copied to a database or spreadsheet.

Other ways to communicate the data to the computers can be used, such as separate data transmission paths for the data streams or multiplexing after conversion to light. Also, if the sensors themselves output data in optical form, the electrical to light conversion can be omitted.

As seen in FIGS. 3a and 4, various components 16, 18, 20 and 24 are enclosed in an enclosure 22 that protects them from the strong RF signals that are present near the antennas 14.

The various components 16, 18, 20 and 24 will now be discussed in more detail.

Embodiments of the present invention provide the first horizontal view from panel antennas with mini digital cameras 18 implemented on top of antenna. The mini cameras will provide a horizontal picture from the office in jpeg or other format via fiber or other communications cable. This feature alone will keep engineers up to date of ongoing developments of coverage area, such as new construction developments of the panel antenna coverage area.

Embodiments of the present invention can include a digital camera with a horizontal view from panel antenna, an altimeter that reads the radiation center of panel antenna which is the height of the panel antenna, and a digital compass to provide accurate azimuth of the panel antenna to engineers with a click of a button. Embodiments of the present invention not only give the panel antenna companies a panel antenna upgrade, but it gives wireless carriers and their design and optimization engineers a way to gather trusted current and accurate data from the panel antenna. Better data imported into the RF prediction tools results in a better analysis of the network.

Two or three Mini Cameras with Wide Angle Zooms allows the engineer to see exactly where the panel antenna is aimed on top of the tower. This camera is mounted to the panel antenna so it has a known (preferably the exact same) horizontal angle (Horizontal Beam width) of the panel antenna. The mini cameras may also be housed in the RF protection shield.

The camera provides an enhanced product that can be used by first responders to exactly capture the moments on the field. The cameras can have a narrow width of 20 degrees angle that allows to pin-point accuracy the area of interest.

An altimeter 24 affixed to the panel antenna read and provides the height of the antenna. In engineering terms this is called the radiation center of panel antenna. The altimeter feature will eliminate the need to pay tower companies to perform a tape drop from a mounted antenna in order to obtain the height of the panel antenna. Instead of doing this manually, a digital reading is obtained. The panel antenna itself will provide this information through the existing fiber cabling connected to the panel antenna.

Altimeter 24 is the device of choice for this application. It does not require a line of Sight or clearance to read the altitude. The altitude is read and directly transmitted through fiber to the OSS/Maintenance Personnel/Construction Team or RF Engineer anytime at the request. This allows a correct reading of the height of the antenna without the need of a human to climb towers for tape drops to read the RAD of the antenna. The Altimeter is preferably placed behind and at the center of the antenna and will be powered through a Low power DC source. Since this device will be used less frequently, it can even be powered by batteries and will work as ON DEMAND where power will only be used to transmit the requested information. Since this is a low power device, interference to the wireless system will be minimal. The altimeter may also have an RF protective shield to avoid RF interference that can distort the reading.

A digital compass 20 is also preferably a component of embodiments of the present invention, which provides the orientation of the panel antenna. In engineering terms this is called the azimuth of the panel antenna. There will be no more cost to spend money for tower companies to climb towers in order to obtain this information. One of the problems seen in the field is the correctness of the azimuths. Sometimes, the wind blowing on the panel antenna can cause the panel antenna to drift a little and therefore, modifying its azimuth. If the panel antenna is not well oriented, it will create additional problems away in a different zone and optimization will spend hours and money to get it fixed. The panel antenna equipped with embodiments of the invention will provide this information. The data can be sent through the existing fiber cabling connected to the panel antenna. This device may also alert engineers in their change of position.

A Digital Compass reads the azimuths of the panel antenna directly from each panel antenna position. One of the problems seen in the field is the correctness of the azimuth. Sometimes, the wind blowing on the panel antenna can cause the panel antenna to drift a little and therefore modify its azimuth. If the panel antenna is not well oriented, it will create additional problems away in a different zone and optimization will require hours and money to get it fixed. By reading the azimuth of a panel antenna from his desk, the engineer does not have to send anyone to the tower to record the azimuths. The compass may also be housed in an RF protection shield.

A dual axis inclinometer 16 placed on top of antenna reads the inclination of the panel antenna. Sometimes, field staff do not mount the panel antenna correctly or loosened screws or heavy weather cause the panel antenna to lose its level. Embodiments of the invention will provide that information to the engineer without having to move from the desk. An inclinometer reads the inclination of the panel antenna and sends the information to the engineer. Sometimes, field staff do not mount the panel antenna correctly. Also sometimes a loose screw or heavy weather causes the panel antenna to lose its level. This improvement will provide that information to the engineer without having to move from the desk. The Digital Leveler may also be housed in the RF protection shield.

By a click of a button the certain embodiments of the present invention will also provide the full description of the panel antenna. Again, wireless carriers will no longer have to hire a tower company to confirm make and model of the panel antenna. Time spent traveling to each site to retrieve the panel antenna information can be eliminated. Embodiments of the present invention will help engineers collect the correct panel antenna data for inputs into prediction tools such as Atoll (available from Forsk (SAS) SARL, 7 rue des Briquetiers, Blagnac, France F31700), Aircom Asset (available from Teoco, Inc. 12150 Monument Drive, Suite 400, Fairfax, Va. 22033), Mentum Planet (available from InfoVista S.A.S., 6, rue de la Terre de Feu, 91952 Courtaboeuf Cedex, France) and many other tools used in this capacity.

These prediction tools are very important for design and optimization engineers to conduct analysis of their network. The more accurate the information implemented into these tools, the better the result of the analysis. Engineers will be able to make a better decision with better data about a specific installation arising from embodiments of the present invention.

Embodiments of the present invention may also reduce or eliminate the hours spent in scoping meetings. Scoping meetings consist of RF engineers, construction engineers, and site acquisition personnel to go over each site, one at a time to determine a design. In these meetings the RF design engineer provides his design of sites discuss during the meeting. The most import part of the meeting is for the design engineer to know the model and type of antenna, what position it is mounted, it height, weight, and the technology associated with the antenna. Embodiments of the present invention provide the design engineer with this information by a click of a button. There are no more hours spent looking at countless construction drawings, and pictures in order to gather this information. Hours spent in scoping meetings gathering this information will decrease to minutes.

Embodiments of the present invention assist engineers in a major way by providing trusted, current and accurate panel antenna data from the panel antenna itself. Embodiments of the present invention provide information on one or more of the following:

- Transmitters
- Diplexers
- Combiner
- Triplexer
- Cabinet (GSM, UMTS, LTE)
- 24×7 accurate existing cell tower configuration
- Output of cell tower configuration in excel or other data storage
- Output of plumbing diagram in an image-forming software such as Visio, or the like.
- Make and model of tower cabinet
- Make and model of diplexers
- Make and model combiners
- Make and model of Quadplexers
- Make and model of duplexers
- Make and model of RRU (Remote Radio Unit)
- Fiber Squid
- Power squid
- TMA(Tower Mounted Amplifier)
- GMA (Ground Mounted Amplifier)
- Make and model of Low noise amplifiers
- Instant horizontal picture of antenna coverage area.
- Provide Make and model of antenna.
- Triangulation enhancement for location capabilities.
- Public safety answering points with a horizontal view of E-911 caller location.
- A full description of panel antenna.
- Reads the Height and weight of antenna.
- the position the antenna is mounted.
- the technology it is serving (i.e. 2G 3G, 4G, GSM, and the like).
- Provides the band and frequency it is serving.
- Conducts self-diagnostics antenna test and sends alerts of results.
- On demand Software upgrades to meet system and network enhancements/growth.
- the azimuth of the panel antenna.
- the inclination of the panel antenna
- the radiation center at the panel antenna.
- Information about neighboring panel antennas Embodiments can assist engineers to better control coverage areas. Antenna data can be imported into current RF prediction tools. Software upgrades for current and new antenna features/enhancements.

Embodiments of the invention can be used with conventional triangulation solutions. First responders will be able to locate the site of a problem through the camera. The camera will be divided in small pixels that will use a system of interpolation from the antenna to the last mile of coverage of the antenna. These pixels will correspond to bins that will allow to map the exact area of coverage of the antenna. By mapping the exact area of coverage through bins, these will provide the exact square of 30' or less to $1^{st}$ Respondents where an incident occurred, allowing faster intervention.

Embodiments of the present invention provide quick access to retrieve data from the panel antenna itself, decreasing time spent in the field gathering pertinent information of the antenna coverage area.

Embodiments of the present invention can be incorporated in panel antenna manufacturing by companies such as Commscope Corporation, and Katherein, CSS, Cell Max, and other companies that produce panel antennas. For years, panel antenna manufacturers have sold panel antennas to service their air interface. Embodiments of the present invention enhance the panel antenna by making the antenna more valuable to wireless carriers.

All these components will be mounted on the panel antenna, Camera+Inclinometer+Compass at the top and the Altimeter at the middle of the panel antenna but on the side face of the panel antenna so to have a clear path to the ground.

The data from these sensors can be tied together for Design and Optimization engineers to be able to capture a horizontal snapshot of the area covered by the panel antenna. Cameras can be attached to the optical fiber used by panel antennas so the electrical tilts of the panel antenna which changes the area covered by the panel antenna can also control the area covered by the camera.

The compass and Level are preferably mounted on top of the panel antenna and connected to the same fiber bus that brings bursts of information down through the optical fiber. Since the optical fiber is only used per action of the Engineer, that cable can be enhance to also carry the information from the Camera (that can be still as a picture or short videos at a specified interval of time).

In operation, embodiments of the present invention permit RF Engineers and construction Engineers to stay in their offices and, with a click of the mouse, receive the information from the sensors on the panel antenna on top of the tower. They can verify the Azimuths of each panel antenna, take a snapshot of the field information without having to rely on Google Earth that does not provide instantaneous shots. This information may be fed through the optical fiber or any other cable and received at the Engineer's terminal for presentation and analysis. Data can be queried in several modes, such as in response to a specific request (pressing a button), automatically at long period intervals (on the order of a year) or repeatedly at short period intervals (on the order of a second).

Camera information may be sent into bursts of data or at the engineer's need as a jpg picture. An enhancement of this product will provide information on problem areas as seen by the UE. That information will be read directly by the camera and fed to the engineers in order to read the exact location and the environment within the problem area.

Another enhancement of this product can be used with conventional triangulation solutions and that first responders use to be able to locate, through the camera, the object of the problem. The camera image may be divided in small pixels so that a system of interpolation from the panel antenna to the last mile of coverage of the panel antenna helps. These pixels will correspond to bins that will allow mapping of the area of coverage of the panel antenna. Mapping the exact area of coverage through bins will provide the exact square of 30' or less to first respondents where the incident occurred, allowing faster intervention.

Embodiments of the invention may have the ability to read the other antennas that are mounted on the tower. It will provide also the full description of its neighboring antennas that are utilized for different technologies. A barcode system will also be put in place. The bar code is affixed to the antenna to uniquely identify the antenna, and the antenna's unique identifier is recorded in the design file database, so that information about that antenna and its connections can be accurately tracked. For example: antenna 1 will read and transmit the information of Antenna 2, if and when needed and Antenna 2 will do the same for antenna 1. In case there is only 1 antenna, or stacked antennas like in the case of Stealth Structure, no information will be transmitted for the neighbors. The antenna 18 should have its own self reading system that will allow it to provide that information if and when needed. This information is stored in the Reader during or prior to installation.

Embodiments may also have the ability to perform a self-diagnostic test. The diagnostic test can include routines such as transmit and receive power values and send alerts if these changed. This will help performance teams to identify an antenna that needs to be replaced.

In some embodiments, voice recognition or voice command software can be used to create or input data to the design file and/or plumbing diagram.

Systems in accordance with this invention may be used with the system disclosed in U.S. Pat. No. 8,471,780 or its continuation U.S. Pat. No. 8,766,873 both to Dalmazzo, the entire disclosures of which are incorporated herein by reference.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for monitoring equipment on a cellular telephone tower comprising
   equipment on a cellular telephone tower,
   RFID tags attached to the equipment to be monitored on the cellular telephone tower, each tag being on a different item of equipment and storing data about the equipment, and
   an RFID interrogator in close enough proximity to the RFID tags to interrogate the RFID tags that are attached to equipment on the cellular telephone tower, to receive the data stored on the RFID tags about the equipment, and to transmit the data to a remote user,
   wherein the equipment includes a panel antenna and apparatus for monitoring the panel antenna comprising an attachment to the panel antenna that includes a camera, an altimeter, a compass, an inclinometer, and data connections from the camera, altimeter, compass, and inclinometer to a remote computer, so that a user at a remote computer can have information about a panel antennas height, azimuth and inclination and a visual view of the proximity of the antenna,
   wherein the camera, inclinometer and compass are located within an RF protective shield enclosure to avoid RF interference, and
   further comprising a computer equipped with software to create a plumbing diagram from data gathered from the altimeter, compass, and inclinometer, the plumbing diagram showing the configuration of the equipment on the cellular telephone tower.

2. The apparatus as claimed in claim 1 wherein the altimeter mounts to the back of the panel antenna.

3. The apparatus as claimed in claim 1 further comprising software to create a plumbing diagram from data gathered from a site design file, the plumbing diagram showing the configuration of the equipment on the cellular telephone tower.

4. The apparatus as claimed in claim 1 wherein voice recognition or voice command software assists in creating or inputting data to the design file and/or plumbing diagram, the plumbing diagram showing the configuration of the equipment on the cellular telephone tower.

5. The apparatus as claimed in claim 1 further comprising web based software to create a plumbing diagram from data gathered from a site design file, the plumbing diagram showing the configuration of the equipment on the cellular telephone tower.

6. The apparatus as claimed in claim 1 wherein the RFID tags on the equipment on a cellular telephone tower are close enough together to be interrogated by a single RFID interrogator.

7. The apparatus as claimed in claim 1 wherein the altimeter is configured to read the radiation center of the panel antenna which is the height of the panel antenna, and the compass is configured to provide the azimuth of the panel antenna.

8. The apparatus as claimed in claim 1 wherein the system combines data from the RFID tag with data received from the altimeter, compass, and inclinometer make a composite data that identifies the item and gives data sensed about the item.

9. The apparatus as claimed in claim 1 wherein the equipment on the cellular telephone tower comprises a panel antenna.

10. The apparatus as claimed in claim 1 wherein the RFID tags are passive RFID tags.

11. An apparatus as claimed in claim 1 wherein the RFID interrogator is mounted on the cellular telephone tower.

12. An apparatus for monitoring equipment on a cellular telephone tower comprising
    equipment on a cellular telephone tower, the equipment including at least one panel antenna and apparatus for monitoring a the panel antenna, the apparatus for monitoring including a camera, an altimeter configured to read the radiation center of the panel antenna, a compass configured to provide the azimuth of the panel antenna, an inclinometer, and data connections from the camera, altimeter, compass, and inclinometer to a remote computer, so that a user at a remote computer can have information about a panel antennas height, azimuth and inclination and a visual view of the proximity of the antenna, wherein the camera, inclinometer and compass are located within an RF protective shield enclosure and the altimeter mounts to the back of the panel antenna,
    passive RFID tags attached to the panel antenna and to the apparatus for monitoring the panel antenna, each tag being on a different item of equipment and storing data about the equipment to which it is attached, an RFID interrogator in close enough proximity to the RFID tags that are attached to the panel antenna and the apparatus for monitoring the panel antenna to interrogate the RFID tags, to receive the data stored on the RFID tags about the equipment, and to transmit the data to a remote user, and a computer equipped with software to create a plumbing diagram from data gathered from the altimeter, compass, and inclinometer, the plumbing diagram showing the configuration of the equipment on the cellular telephone tower.

13. An apparatus as claimed in claim 12 wherein the RFID interrogator is mounted on the cellular telephone tower.

* * * * *